United States Patent [19]
Engelking

[11] 3,893,487
[45] July 8, 1975

[54] HIGH PRESSURE HYDRAULIC FITTING
[75] Inventor: Frederick S. Engelking, Peoria, Ill.
[73] Assignee: Caterpillar Tractor Co., Peoria, Ill.
[22] Filed: Dec. 26, 1973
[21] Appl. No.: 428,614

[52] U.S. Cl. .................. 138/89; 138/96; 220/39
[51] Int. Cl. ............................................ B65d 51/00
[58] Field of Search ......... 138/89, 96 R, 96 T; 16/2, 16/108; 285/95, 109, 110, 107; 220/39 R, 39 B

[56] References Cited
UNITED STATES PATENTS

| | | | |
|---|---|---|---|
| 2,070,296 | 2/1937 | Osborn | 138/96 T |
| 2,084,568 | 6/1937 | White | 220/39 R |
| 3,056,427 | 10/1962 | Higgins | 138/96 T |
| 3,255,916 | 6/1966 | Rice | 220/39 R |
| 3,578,027 | 5/1971 | Zopfi | 138/89 |

Primary Examiner—Henry K. Artis
Assistant Examiner—James E. Bryant, III
Attorney, Agent, or Firm—Phillips, Moore, Weissenberger Lempio & Strabala

[57] ABSTRACT

A fitting for utilization in high pressure hydraulic systems including a threaded plug and housing having a threaded bore. The housing has a bevelled portion for mating engagement with a correspondingly bevelled surface on the threaded plug. Disposed within a groove upon the threaded plug is an elastomeric annular "O"-ring seal. Upon pressurization of the hydraulic system, the threaded plug tends to move axially with respect to the threaded bore to create a gap between the respective bevelled surfaces of the housing and the plug, into which gap the elastomeric seal ring tends to extrude. For any given amount of axial movement of the threaded plug under pressure, the gap between the respective bevelled surfaces will be appreciably less with a consequent reduction in the tendency and extent of seal ring extrusion thereinto.

6 Claims, 3 Drawing Figures

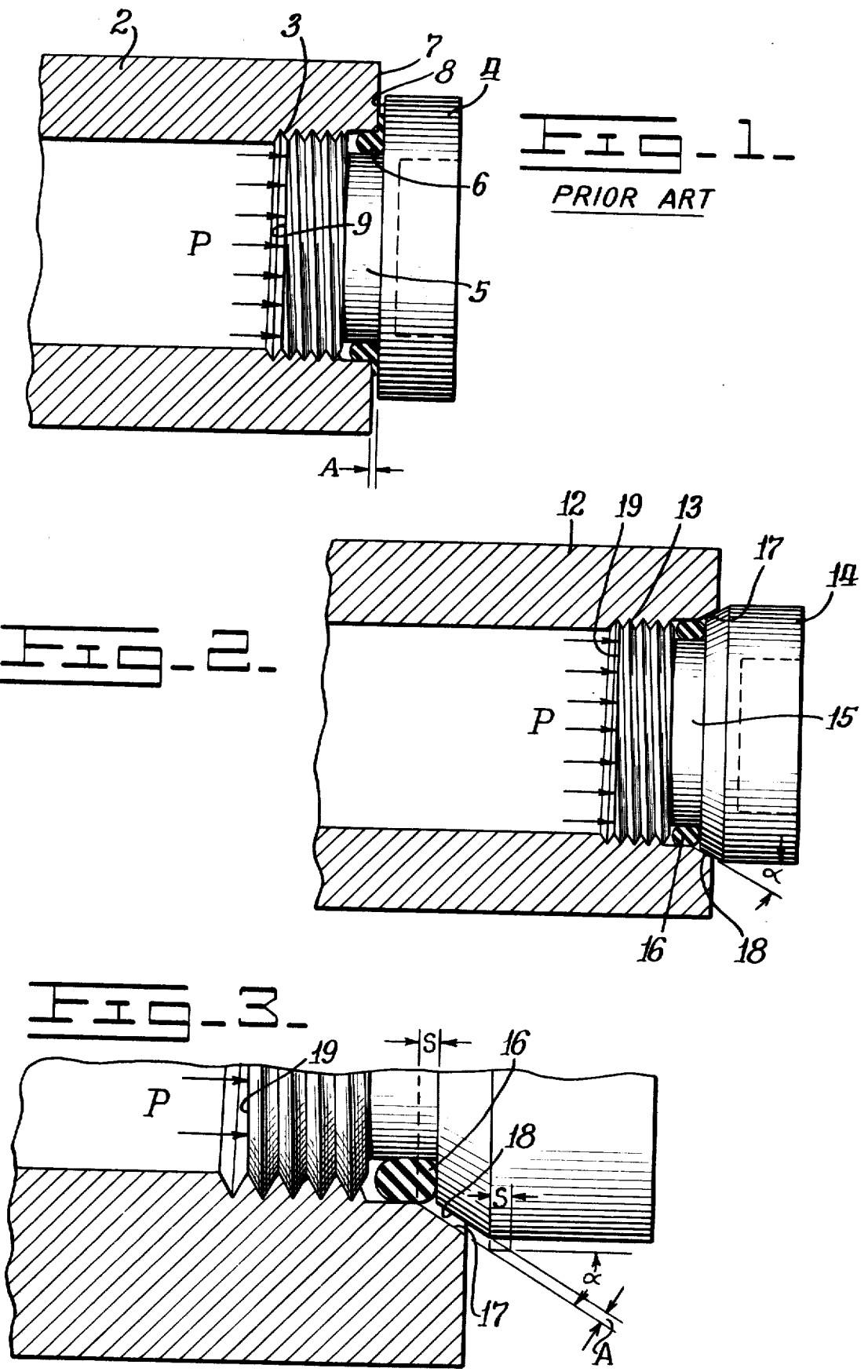

HIGH PRESSURE HYDRAULIC FITTING

BACKGROUND OF THE INVENTION

This invention relates to a high pressure fitting for use in a hydraulic system. In particular, it relates to a threaded plug-type fitting which includes an elastomeric "O"-ring.

Most prior art plug-type fittings are fabricated with a right angle flange which seats against a machined surface of a housing containing a threaded bore for mating engagement with the threads of the plug. These prior art systems often utilize elastomeric "O"-rings for sealing, and such rings are generally disposed within an annular groove or thread relief formed near the flange of the plug. When such threaded plugs having right angle flanges are tightened to standard torque values and are exposed to high pressure fluids within the system, such plugs tend to move axially with respect to the housing to an extent dependent upon the degree of tightening and upon the pressure applied. The gap created between the right angle flange of the plug and the housing presents an area into which the elastomeric "O"-ring tends to extrude due to passage of high pressure fluid around the threads. When this occurs, and when hydraulic pressure applied is subsequently reduced, the "O"ring is often severely damaged by the gradual pinching effect caused by the repetitive opening and closing of the gap.

Some examples of prior art couplings utilizing seals are shown in U.S. Pat. Nos. 2,443,187 to Hobbs; 3,147,984 to Benoit; 3,148,901 to Campbell; 3,160,426 to Faeser; and 3,255,916 to Rice.

SUMMARY AND OBJECTS OF THE INVENTION

The instant invention provides an improved fitting for high pressure hydraulic systems. The fitting includes a housing having a threaded bore therein and a first bevelled surface proximate the threaded bore. A threaded plug is provided for threadable engagement within said threaded bore and the plug has a second bevelled surface on the seal retaining flange thereof. The plug further includes an annular groove within which is mounted an elastomeric "O"-ring seal. Upon axial displacement of the plug with respect to the housing to a first predetermined extent under the influence of hydraulic fluid under pressure, the gap created between the first and second bevelled surfaces is a second predetermined value substantially less than the first predetermined value.

The main object of the present invention is to provide a fitting for a high pressure hydraulic system which substantially reduces the tendency for seal ring damage.

A more specific object of the present invention is to provide a threaded fitting for a high pressure hydraulic fluid system which substantially reduces the extent of "O"-ring extrusion for any given value pressure application to the fitting.

Other objects and advantages of the present invention will become apparent from the following description and drawing.

BRIEF DESCRIPTION OF THE DRAWING

FIG. 1 is a sectional elevation of a prior art high pressure hydraulic fitting;

FIG. 2 is a sectional elevation of the hydraulic fitting of the present invention; and FIG. 3 is an enlarged cut-away view of a portion of the fitting shown in FIG. 2 and showing the threaded plug in displaced disposition.

DETAILED DESCRIPTION

With reference to FIG. 1 in the drawing, a prior art fitting for a high pressure hydraulic system may be appreciated. A housing 2 is provided with a threaded aperture 3 within which is received the threaded shank portion of a plug 4. The plug member is equipped with a groove or relieved area 5 within which is disposed an elastomeric "O"-ring seal 6. As may be readily appreciated from the drawing, the housing has a first abutment surface 7 which mates with the second abutment surface or flange 8 of the plug when the plug is tightened with respect to the housing. The surfaces 7 and 8 are in engagement when there is little or moderate pressure within the system. However, upon the application of extremely high hydraulic fluid pressure upon an end surface 9 of the threaded plug, the plug moves axially with respect to the housing such that a gap (A) is created between the surfaces 7 and 8.

The size of this gap depends upon the pressure exerted upon the surface 9 and upon the torque which has been applied to tighten the plug 4 within the housing 2. For example, the plug having a thread size of 1⅞ inches when tightened to a torque rating of 120 ± 10 ft.-lb. will move axially a distance of 0.003 inch when 6500 psi is applied to the surface 9. For the sake of simplicity, the same set of values for pressure applied, thread size, and tightening torque will be used hereinafter to explain the advantages of the present invention. It should be understood, however, that various different tightening torque ranges are recommended for plugs of various sizes and pressure applications.

As is readily apparent from FIG. 1, the size of the gap (A) is equal to the amount of axial movement of the plug and the elastomeric "O"-ring 6 tends to extrude into such gap to that same extent. Upon reduction of the application of a pressure (P) to the surface 9, the plug 4 tends to return axially toward the surface 7 and to pinch the extruded portion of the ring 6 between the surfaces 7 and 8 often causing severe damage to the seal.

With reference to FIGS. 2 and 3 of the drawing, the structure and advantages of the present invention may be readily appreciated. Included is a housing 12 having a threaded bore 13 within which is received a threaded portion of a plug 14. The plug has a groove 15 for receiving an elastomeric "O"-ring seal 16, like the ring 6 in FIG. 1. However, unlike the prior art fitting, the instant housing has a bevelled surface machined thereon at a distal portion of the threaded bore 13. The plug 14 also has a bevelled surface 18 which precisely conforms for mating engagement with the bevelled surface 17. The bevel angle ($\alpha$) which the surfaces 17 and 18 make with respect to the bore axis of the fitting may be any acute angle but is preferably 30° or less.

By recourse to the previously applied example and utilizing an angle ($\alpha$) of 30°, the advantages of the present invention may be readily appreciated. When, as in the previous example, a pressure (P) of 6500 psi is applied to the surface 19 of the plug 14 which is tightened to the recommended torque, the plug displaces axially the amount (S), as shown. Concomitantly, a gap (A) is created between the bevelled surfaces 17 and 18. As is known from the previous example, the value for the axial displacement (S) is 0.003 inch. From the geometry of FIG. 3, it is apparent that the gap (A) may be readily determined by multiplying (S) by the sine of ($\alpha$). where $\alpha=30°$, therefore, the gap (A)=0.0015 inch. Thus, it is seen that by forming the bevelled surfaces at an angle of 30° with respect to the axis of the fitting bore, the gap created between the mating surfaces of the components into which the seal ring tends to extrude is reduced by 50 percent. By choosing angles for the angle ($\alpha$) of less than 30°, the reduction in gap size is even more dramatic.

It may be seen that the instant invention provides a high pressure fitting for a hydraulic system which utilizes a conventional elastomeric "O"-ring seal for sealing between the components but which substantially reduces the tendency for such seal to extrude between the components and to be damaged by pinching action upon reduction of pressure within the system.

While the invention has been described with particular reference to the preferred embodiments, it is apparent that variations and modifications are possible within the purview of the inventive concepts. No limitation with respect to such variations and modifications is intended, except by the scope of the appended claims.

What is claimed is:

1. A fitting assembly for a high pressure fluid system including; housing means for containing said high pressure fluid, said housing means including an axially extending bore, plug means for being received within said bore for selective closure thereof, seal means disposed between said plug means and said housing means for preventing egress of fluid from said bore when said plug means is positioned for closure thereof, said housing means including a first bevelled surface proximate said seal means and disposed at a first predetermined angle with respect to the axis of said bore, said plug means including a second bevelled surface proximate said seal means and disposed at said first predetermined angle with respect to said axis for abutting engagement with said first bevelled surface when said plug means is positioned for closure of said bore, said first predetermined angle being acute, said plug means including a plug member having an enlarged head portion and having a reduced section shank portion, said plug member further having a further reduced section annular groove thereon axially between said head portion and said shank portion, said seal means being disposed in said annular groove and not between said first and second bevelled surfaces.

2. The invention of claim 1 wherein said bore is cylindrical and wherein screw threads are provided in said bore and upon a portion of said plug means for mutual mating engagement.

3. The invention of claim 1 wherein said seal means include an elastomeric annular ring member operatively disposed in said annular groove.

4. The invention of claim 1 wherein said first bevelled surface forms a first frustum of a right circular cone having an apex on said axis of said bore having an angle of rotation equal to said first predetermined angle and wherein said second bevelled surface forms a second corresponding frustum.

5. The invention of claim 4 wherein said first predetermined angle is between 1° and 45°.

6. The invention of claim 5 wherein said first predetermined angle is 30°.

* * * * *